No. 829,827. PATENTED AUG. 28, 1906.
E. H. ANDERSON.
POWER TRANSMITTING MECHANISM.
APPLICATION FILED APR. 9, 1904.

2 SHEETS—SHEET 1.

Witnesses
Elnathan E. Buggs
Helen Orford

Inventor:
Edward H. Anderson
by Albert S. Davis
Atty

No. 829,827. PATENTED AUG. 28, 1906.
E. H. ANDERSON.
POWER TRANSMITTING MECHANISM.
APPLICATION FILED APR. 9, 1904.

2 SHEETS—SHEET 2.

Witnesses.
Jonathan E. Briggs.
Helen Orford

Inventor:
Edward H. Anderson.
by Albert H. Davis
Atty.

UNITED STATES PATENT OFFICE.

EDWARD H. ANDERSON, OF SCHENECTADY, NEW YORK, ASSIGNOR TO GENERAL ELECTRIC COMPANY, A CORPORATION OF NEW YORK.

POWER-TRANSMITTING MECHANISM.

No. 829,827.  Specification of Letters Patent.  Patented Aug. 28, 1906.

Application filed April 9, 1904. Serial No. 202,376.

*To all whom it may concern:*

Be it known that I, EDWARD H. ANDERSON, a citizen of the United States, residing at Schenectady, county of Schenectady, State of New York, have invented certain new and useful Improvements in Power-Transmitting Mechanism, of which the following is a specification.

My invention relates to the control of power-transmission mechanisms, and has particular reference to mechanisms in which a prime mover or other source of mechanical power running at a constant or at any speed independent of the speed of the load is geared to the load through an electric transmission device, whereby the speed of the load and the torque exerted thereon are controllable at will by the operator.

The electric transmitting device to which my invention relates consists of a generator element and a motor element, torque being transmitted to the load through the reaction of the relatively movable members of the generator, while current developed in the generator by the relative movement of its members is led to the motor, by which it is transformed into mechanical energy, which is then applied to assist in driving the load. The speed and torque conveyed to the load are primarily controlled by controlling the electrical energy developed in the generator; but this energy instead of being wastefully converted into heat in resistances or the like is reconverted into mechanical energy and applied to assist in driving the load.

The object of my invention is to provide a system of control for such mechanisms which shall increase their flexibility, range of speeds, and economy of operation.

My invention will best be understood from the accompanying drawings, in which—

Figure 1:
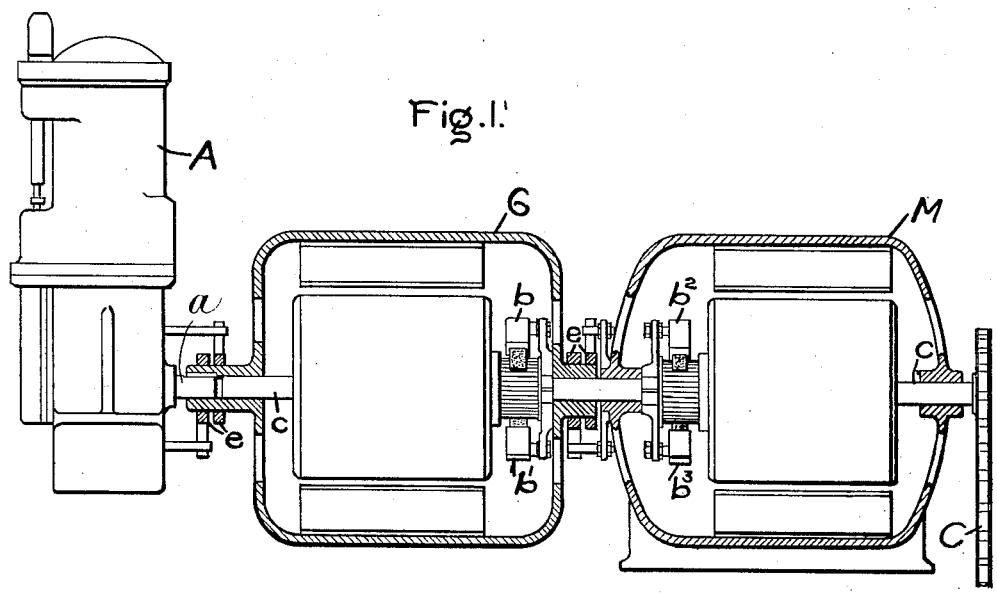
Figure 2:
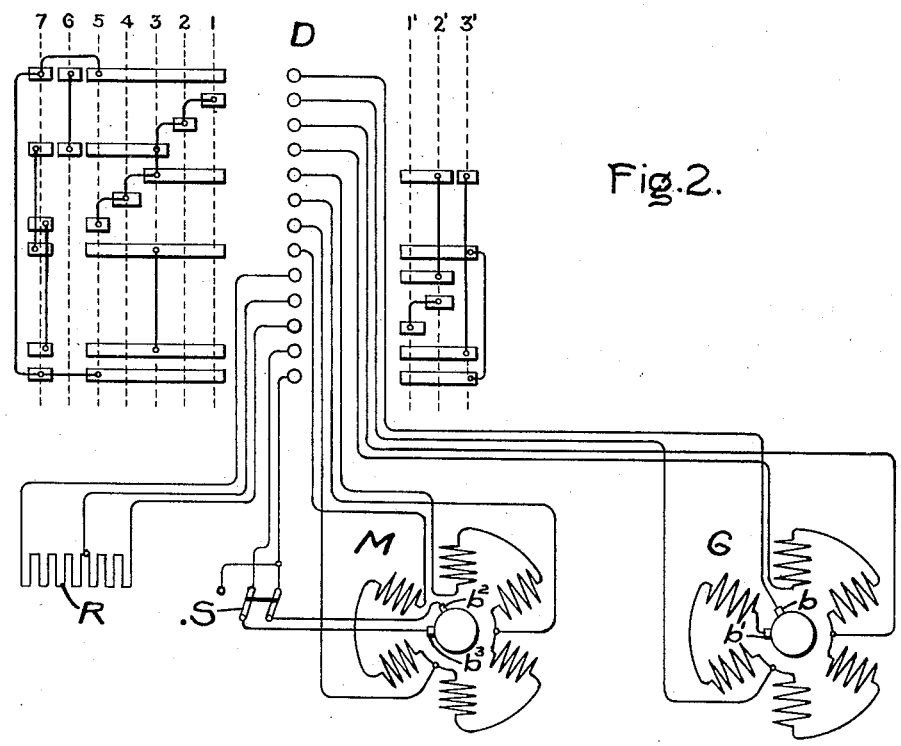
Figure 3:
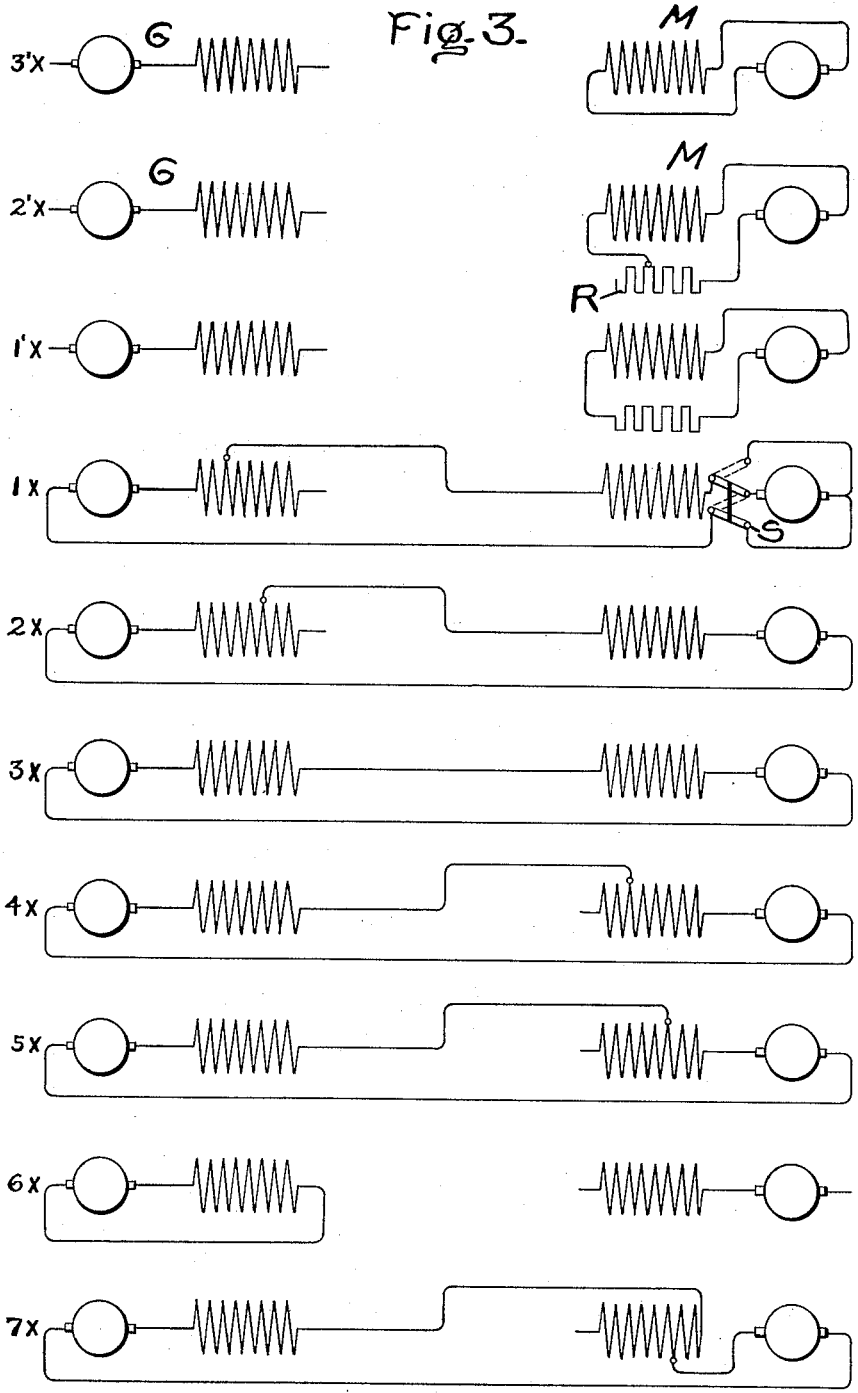

Figure 1 shows a form of transmission mechanism, as outlined above, to which my invention is applicable. Fig. 2 shows a controlling-switch and circuit connections adapted to my invention, and Fig. 3 shows a series of diagrams representing the circuit conditions produced by the controlling-switch of Fig. 2 in its various positions.

In Fig. 1, A represents a prime mover, which I have indicated as a gas-engine. It will be understood, however, that my invention is applicable to mechanisms driven by any other form of motive device, such as a steam-engine, water-wheel, or electric motor. For convenience, however, I call the motive device a "prime mover" or "engine."

Mounted upon the engine-shaft $a$ is the field of the generator G, which is rotatably mounted, so as to be driven by the engine-shaft. Current is conducted to the generator-field by the slip-rings $e$, of which I have shown four, two on each side of the generator. The armature of generator G is mounted on the shaft $c$, which drives the load by means of the sprocket-chain C at the opposite end of the shaft. The load, which is not shown, may be of any character, although my invention is particularly advantageous in its applications to transmission mechanisms for driving automobiles. If the armature-circuit of the generator is closed, it is evident that by means of generator G alone, arranged as shown, the speed of the load may be varied by varying the current, and consequently the slip of the generator, either by varying the field or by the use of shunt or series resistances in the generator-circuit. Both methods, however, are subject to the objection that the torque delivered to shaft C could in no case be greater than the engine torque and the energy consumed in resistances would be wasted. Consequently it has been proposed to provide the motor M for receiving the electrical energy produced by the generator G and for transforming this energy into useful mechanical work.

The armature of motor M is mounted on shaft C, while its field is stationary. If the current produced in generator G by the relative movement of its members is passed through motor M and if the armature and field of motor M are connected in proper relation, a torque will be produced in motor M which will be added to the generator torque. Furthermore, by varying the field strength of motor M the speed and torque applied to the load may be varied, since an increase of field strength of motor M increases its counter electromotive force, which reacts upon the generator, tending to decrease the current-flow, and thereby producing a greater relative movement of its members, or, in other words, a diminished speed for the load. Moreover, this increase of the motor-field increases the motor torque, so that the decrease in speed applied to the load is transformed into added torque. On the other hand, as the motor-field is weakened its counter electromotive force and torque are diminished and the speed of the load is consequently increased, while the torque applied thereto is diminished. If the motor-field is reduced to zero, the generator G is practically short-circuited and acts as a clutch, driving the load at approximately the engine speed and with the engine torque. By my invention I add to the control system outlined above a number of novel features, whereby the range, flexibility, and economy of the transmission mechanism is greatly increased.

One of the novel features which I provide consists in the arrangement of circuits adapted to produce a load speed greater than the engine speed. Another feature consists in an arrangement whereby I obtain a reversal of direction of the load without the employment of any mechanical reversing-gears. Another novel feature consists in providing means for allowing the load to be picked up gradually and without sudden shock. Another feature consists in the means I employ for varying the field strengths of the machines, whereby more economical operation is obtained than with the means heretofore in common use, and I desire it to be understood that although I shall hereinafter explain these features as applied to the control of a power-transmission mechanism arranged as shown in Fig. 1, my invention is not limited to this particular arrangement, but is applicable to other forms of transmission mechanism in which the connections of the several parts of the two dynamo-electric machines to the prime mover, the load, and to each other may be different from that shown.

It has been stated above that by opening the motor-circuit and short-circuiting the generator on itself the generator acts as a clutch and drives the load at practically the engine speed. Now if the motor-field be reversed and a small fraction of the field included in circuit motor M will become a generator and return current to generator G. The machine M then absorbs a portion of the torque transmitted through generator G, but transforms it into electric energy, which, impressed upon generator G, drives its armature at a speed above the speed of the field, and thereby increases the speed of the load above the engine speed. Thus by varying the motor-field the speed and torque of the load may be varied over wide limits, the speed varying from zero to an amount higher than the gas-engine speed and the torque varying from an amount in excess of the gas-engine torque to an amount lower than the gas-engine torque. Furthermore, variations may be obtained by varying the field of the generator, the speed and torque of the load at all times depending upon the relative torque per ampere of the two machines. Thus if the load is stationary and the generator G with a weak field be connected to the motor M with a strong field, the motor M being connected to produce a torque in the opposite direction to that of generator G, a backward rotation of the load may be obtained, since with the same current flowing through both machines motor M will produce a stronger torque than generator G.

In Fig. 2, D represents a controlling-switch with seven running positions (indicated by the dotted lines 1 2, &c.) and three brake positions, (indicated by the dotted lines 1' 2' 3'.) The generator G and motor M are shown as series-wound machines connected to the controlling-switch, the reversing-switch S being placed in the armature-circuit of motor M. Although my invention is not limited in all its features to series-wound machines, I find such machines are best adapted to power-transmission mechanisms of the kind under consideration. With the controlling-switch D in position 1 the circuits are as follows: from brush $b$ of generator G, through the controlling-switch D and reversing-switch S to motor-armature brush $b^2$, thence from the other armature-brush $b^3$ back through the reversing-switch S to controlling-switch D, thence through the entire field of motor M, thence through one-third of the field of generator G back to brush $b'$. A series circuit is thus completed through the armature of the generator, one-third of the generator-field, the armature of the motor, and the whole motor-field. At starting the motor-armature is at rest relative to its field, and consequently the generator G is practically short-circuited with one-third field, and will therefore pick up. Two-thirds of the generator-field are cut out at starting in order to allow the generator-field to pick up gradually, thereby limiting the starting-current in the machines and avoiding a sudden shock on the load. The circuit connections for this position are shown in Diagram $1^\times$ of Fig. 3. As the generator picks up and the load is started controlling-switch D is moved to its second position. This, as will be seen from an inspection of the drawings, cuts in another third of the generator-field, as shown in Diagram $2^\times$. On moving to the third position of controlling-switch D the whole generator-field is in circuit, as shown in Diagram $3^\times$. This is the maximum torque slow-speed position, and for starting a heavy load, such as an automobile, on a grade the controller would be brought forward to position 3 immediately. Positions 1 and 2 might be omitted from the controller D; but they serve to prevent too sudden a building up of the generator and too sudden a start of a light load, such as an automobile starting on the level. Furthermore, these positions make it possible to obtain a very high torque in case of an emergency. With the engine running at normal speed the generator produces a low voltage with only part of its field in circuit, and consequently does not give as high a torque as with full field; but in case of an emergency the engine could be speeded up to give full-generator voltage with part field, thereby overloading the motor and giving a very large starting torque. In other words, when the engine is running at normal speed and driving the generator with weak field the engine is running at part load only and with a torque much below its maximum; but by speeding up the engine, and thereby increasing the generator-voltage, the engine torque is increased, and since the motor has a strong field and the generator a weak field the motor torque is several times as great as the generator torque, which is always equal to the engine torque, thereby impressing on the load a torque several times greater than the maximum torque of the engine.

With the controller at position 3 and the circuit connections as shown in Diagram $3^\times$ both machines are connected for maximum torque. The reversing-switch 5 is supposed to have been placed in the proper position for connecting the motor to produce a torque in the same direction as the generator. Consequently the torque impressed upon the load is double the engine torque and the load speed is one-half the engine speed, provided the motor and generator are the same size, or, in other words, produce the same torque per ampere with full field. If more than double the engine torque is required, it can be obtained by designing the motor M for a greater torque than the generator. Thus if motor M is designed for three times the output of generator G the torque impressed upon the load will be four times the engine torque in the position 3 of the controller. The speed of the load in this case will be approximately one-fourth the engine speed.

When controlling-switch D is moved to position 4, one-third of the motor-field is cut out. This is shown in Diagram $4^\times$. When the motor-field is thus weakened, the counter electromotive force and torque per ampere decrease, and the load will consequently speed up, as has been heretofore explained. In passing to position 5 the motor-field is still further weakened, as shown in Diagram $5^\times$, giving a still higher speed. In passing to position 6 the generator G is short-circuited on itself, as shown in Diagram $6^\times$, and consequently acts as a clutch. With the controller in this position the engine is clutched to the load, which is consequently driven at approximately the engine speed and with the engine torque. In passing to position 7 of controller D the motor is again included in circuit with a weak field and with its field reversed, as shown in Diagram $7^\times$. With this arrangement of circuits, as has been heretofore explained, the motor M acts as a generator, absorbing a portion of the torque transmitted through generator G, converting it into electrical energy, and impressing it upon generator G so as to drive the generator-armature faster than its field is driven by the gas-engine. The load is now operating at a higher speed than that of the gas-engine, but with a lower torque than the gas-engine torque. Now if it is desired to brake the load, controlling-switch D is moved to position 1'. In this position of the switch the motor-armature is connected to its field, but reversed relatively thereto, and the armature and field are short-circuited through the resistance R, as shown in Diagram $1'^\times$. The motor M consequently acts as a brake in a manner that will be well understood. In passing to positions 2' and 3' resistance R is partially and wholly cut out of circuit, as shown in Diagrams $2'^\times$ and $3'^\times$, thereby increasing the braking torque.

If the load has been brought to rest and it is desired to reverse the direction of movement, reversing-switch S is thrown to its other position and controlling-switch D again moved to position 1. This is shown by the position of switch S, (indicated in dotted lines in Diagram $1^\times$,) switch S being omitted from the other diagrams for the sake of simplicity. As has been heretofore explained, generator G picks up, forcing current through motor M, which at starting is at rest and acts as a short circuit for generator G. The current forced through motor M by generator G produces a torque, but this time the torque is in the opposite direction to that produced by the generator, owing to the reversal of switch S. Furthermore, with controlling-switch D in position 1 generator G has one-third of its field in circuit, while motor M has its full field in circuit, as shown by Diagram $1^\times$. Consequently if two machines are designed for the same output the torque per ampere of motor M is three times that of generator G. Motor M consequently overpowers generator G and the load moves backward, the torque impressed upon the load being equal to the difference of the generator and motor torques—that is, to two-thirds the motor torque or twice the generator torque. Since the generator torque is at all times equal to the engine torque, a backward torque is impressed upon the load in this position of the controller equal to twice the engine torque. This is on the assumption that the two machines are designed for the same output. If motor M is made larger than generator G, the backward torque is increased relative to the engine torque. For instance, if the motor is designed for three times the output of the generator and motor and generator are connected as shown in Fig. $1^\times$, but with the motor reversed, the motor torque will be nine times the generator torque, and a backward torque will be impressed upon the load, which, if the engine is speeded up to give full generator voltage, may be made equal to eight times the normal engine torque. If while switch S is maintained in its reversed position the controller is moved to position 2, the backward torque will be decreased and the speed increased the same as for forward rotation. If the generator and motor were of the same size, only two positions of the controller could be used for backward rotation, since in position 3 the torque of the two machines would be equal, and since the backward torque is equal to the difference of the torques of the two machines the backward torque would be zero in position 3. If, however, the motor is made three times the size of the generator, the backward torque does not become zero until position 5 is reached, and consequently the first four controller positions could be used for backward rotation. If the load is rotating backward, the braking positions of controller D may be used for stopping the load the same as in the case of forward rotation, since controlling-switch S in its reverse position produces the proper relative connection of armature-field of motor M for braking.

In Fig. 2 I have indicated a six-pole field for both motor and generator and have shown a field control by cutting out pairs of poles. Although other methods of field control may be employed, such as short-circuiting the entire field through variable resistances or cutting out portions of all the field-poles, I prefer to use the method as shown in the drawing, when machines with the usual "series" armature-winding are employed. The advantage of cutting out whole poles consists in the fact that by this method the field strength is reduced by exactly the fraction of the whole number of poles which is cut out, whereas, on account of saturation this is not the case when a fraction of each one of the poles is cut out. Moreover, by this method a commutating field may be always maintained and the sparking which occurs from a weakened field thereby avoided.

It will be seen from the foregoing that by varying the relative field strengths of the two machines, the use of resistances, which simply waste power, or of external sources of current, such as batteries, which increase the complication, is avoided. The variation of the relative field strengths varies the relative torque per ampere of the two machines, thereby rendering it possible in a simple and efficient manner to impart to the load a torque greatly in excess of the engine torque, as has been heretofore explained. If the relative field strengths of the machines were not varied, the relative torques per ampere could not be varied, since the torque is the product of the field strength and armature-current, and consequently the relative torques of the two machines could be varied only by varying the relative flow of current through them, which could be accomplished only by wasting part of the power in resistances or employing an additional source of current.

It is obvious that the controlling-switch and circuit arrangements which I have shown may be greatly varied without departing from the spirit of my invention. Moreover, the mechanical construction of the machines may be varied and the relative size of the machines altered, with the resulting changes in the torque relations which I have pointed out. Accordingly I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. In combination, a prime mover, a driven member, transmission mechanism adapted to transmit the power of the prime mover to the driven member comprising two dynamo-electric machines mechanically connected, means for varying at will the relative torque per ampere of said machines, and means for varying at will the relative connections of armature and field of one of said machines.

2. In combination, a prime mover, a driven member, transmission mechanism adapted to transmit the power of the prime mover to the driven member comprising two dynamo-electric machines both arranged to exert a torque upon the driven member, means for connecting said machines to add their torques for rotation in one direction and to oppose their torques for rotation in the opposite direction, and means for varying their relative torques.

3. In combination, a prime mover, a driven member, transmission mechanism adapted to transmit the power of the prime mover to the driven member comprising two series-wound dynamo-electric machines connected in series and both arranged to exert their torque upon the driven member, means for connecting said machines to add their torques for rotation in one direction and to oppose their torques for rotation in the opposite direction, and means for varying their relative torque per ampere.

4. In combination, a prime mover, a driven member, transmission mechanism adapted to transmit the power of the prime mover to the driven member comprising two mechanically-connected series-wound dynamo-electric machines conected in series, means for varying the relative torque per ampere of said machine, and means for varying the relative directions of their torques.

5. In combination, a prime mover, a driven member, transmission mechanism adapted to transmit the power of the prime mover to the driven member comprising two dynamo-electric machines, one of said machines having both members movable, means for varying at will the relative field strengths of said machines, and means for varying at will the relative directions of their torques.

6. In combination, a prime mover, a driven member, transmission mechanism adapted to transmit the power of the prime mover to the driven member comprising two series-wound dynamo-electric machines connected in series, one of said machines having both members movable, means for varying the relative torque per ampere of said machines, and means for varying the relative directions of their torques.

7. The combination of a motive device, a dynamo-electric generator having two movable members, one driven by said motive device and the other mechanically connected to transmit motion to a load, an electric motor mechanically connected to add its torque to the load, means for varying the effective field-turns of both machines, and means for reversing the relative directions of torque of said machines.

8. The combination of a motive device, a series-wound dynamo-electric generator having two movable members, one driven by said motive device and the other mechanically connected to transmit motion to a load, a series-wound electric motor connected in series with said generator and mechanically connected to add its torque to the load, means for varying the effective field-turns of both machines, and means for reversing the relative directions of torque of said machines.

9. The combination of a motive device, an electric generator having two movable members, one of said members being driven by said motive device and the other mechanically connected to drive a load, an electric motor having one of its members fixed and the other movable with one of the members of said generator, means for varying the field strength of both machines over wide ranges, and means for varying the relative directions of the torques of said machines.

10. The combination of a motive device, a dynamo-electric generator having two movable members, one driven by said motive device and the other mechanically connected to a load, an electric motor mechanically connected to add its torque to the load, and means for reversing the direction of the motor torque and decreasing the generator torque relative thereto whereby the direction of rotation of the load is reversed.

11. The combination of a motive device, a series-wound generator having two movable members, one driven by said motive device and the other mechanically connected to a load, a series-wound electric motor connected in series with said generator and mechanically connected to add its torque to the load, and means for reversing the direction of the motor torque and decreasing the generator torque per ampere relative thereto whereby the direction of rotation of the load is reversed.

12. The combination of a motive device, an electric generator having two movable members, one driven by said motive device and the other mechanically connected to a load, an electric motor mechanically connected to add its torque to the load, means for weakening the motor-field, and means for reversing the motor with weak field whereby the speed of the load is increased above the speed of the motive device.

13. The combination of a motive device, an electric generator having two movable members, one driven by said motive device and the other mechanically connected to a load, an electric motor mechanically connected to add its torque to the load, means for decreasing at will the torque per ampere of the motor relative to the generator, and means for reversing at will the direction of the motor torque whereby the speed of the load is increased above the speed of the motive device.

14. The combination of a motive device, a series-wound electric generator having two movable members, one driven by said motive device and the other mechanically connected to a load, a series-wound electric motor connected in series with said generator and mechanically connected to add its torque to the load, means for weakening the motor-field, means for short-circuiting the generator, and means for again introducing said motor into circuit with a weak field and with its field reversed relative to its armature.

15. In combination, a field-magnet having a plurality of pairs of poles distributed uniformly around its inner periphery, a multipolar "series-wound" armature connected in series with the field, and means for varying the field strength by varying the number of poles in series with the armature.

16. In combination, a dynamo-electric machine comprising a field-magnet having a plurality of pairs of poles distributed uniformly around its inner periphery, and a multipolar "series-wound" armature, and a regulating-switch therefor adapted to cut a pair or pairs of field-poles out of circuit.

17. The combination of a motive device, an electric generator having two movable members, one driven by said motive device and the other mechanically connected to a load, an electric motor mechanically connected to add its torque to the load, and means for reducing the generator torque per ampere relative to the motor torque, whereby the torque impressed on the load is increased relative to the torque of the motive device.

18. The combination of a motive device, a series-wound electric generator having two movable members, one driven by said motive device and the other mechanically connected to a load, a series-wound electric motor connected in series with said generator and mechanically connected to add its torque to the load, and means for weakening the generator-field relative to the motor-field, whereby the motor torque and the torque impressed upon the load are increased relative to the torque of the motive device.

19. In combination, a prime mover, a driven member, transmission mechanism adapted to transmit the power of the prime mover to the driven member comprising two dynamo-electric machines both arranged to exert a torque upon the driven member, and means for connecting said machines to add their torques for rotation in one direction and to oppose their torques for rotation in the opposite direction.

20. In combination, a prime mover, a dynamo-electric generator having two movable members, one driven by said prime mover and the other mechanically connected to a load, an electric motor mechanically connected to add its torque to the load, and means for reversing the direction of the motor torque whereby the direction of rotation of the load is reversed.

21. In combination, a prime mover, a dynamo-electric generator having two movable members, one driven by said prime mover and the other mechanically connected to a load, an electric motor connected to add its torque to the load, and means for weakening the generator-field at starting.

22. In combination, a prime mover, a series-wound electric generator having two movable members, one driven by said prime mover and the other mechanically connected to a load, a series-wound electric motor adapted to be driven by said generator and mechanically connected to add its torque to the load, and means for cutting out a portion of the generator-field at starting.

23. In combination, a prime mover, an electric generator having two movable members, one driven by said prime mover and the other mechanically connected to a load whereby the torque of the prime mover is transmitted through said generator to the load, and means for causing the current produced by the relative movement of the members of said generator to produce a torque on the load opposite to and greater than the torque of the prime mover, whereby backward rotation of the load is obtained.

24. In combination, a prime mover, an electric generator having two movable members, one driven by said prime mover and the other mechanically connected to a load whereby the torque of the prime mover is transmitted through said generator to the load, an electric motor mechanically connected to add its torque to the load, and means for causing the current produced by the relative movement of the members of said generator to produce in said motor a torque opposite to and greater than the torque of the prime mover, whereby backward rotation of the load is obtained.

In witness whereof I have hereunto set my hand this 8th day of April, 1904.

EDWARD H. ANDERSON.

Witnesses:
BENJAMIN B. HULL,
HELEN ORFORD.